United States Patent
Bolourchi et al.

(10) Patent No.: US 8,149,895 B2
(45) Date of Patent: Apr. 3, 2012

(54) METHOD AND SYSTEM FOR CODE REUSE AND CAPACITY ENHANCEMENT USING NULL STEERING

(75) Inventors: Nadar Bolourchi, Larchmont, NY (US); Leonid Kazakevich, Plainview, NY (US); Rui Yang, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 594 days.

(21) Appl. No.: 12/329,516

(22) Filed: Dec. 5, 2008

(65) Prior Publication Data
US 2009/0135889 A1 May 28, 2009

Related U.S. Application Data

(60) Continuation of application No. 11/731,617, filed on Mar. 30, 2007, now Pat. No. 7,469,021, which is a division of application No. 10/284,741, filed on Oct. 31, 2002, now Pat. No. 7,218,684.

(60) Provisional application No. 60/335,616, filed on Nov. 2, 2001.

(51) Int. Cl.
*H04B 1/00* (2006.01)
(52) U.S. Cl. ........................................ 375/142; 375/130
(58) Field of Classification Search .................. 375/142, 375/130, 146, 148, 199, 260; 370/320, 335, 370/342
See application file for complete search history.

(56) References Cited

U.S. PATENT DOCUMENTS

| | | | |
|---|---|---|---|
| 4,771,289 A | 9/1988 | Masak | |
| 5,768,307 A | 6/1998 | Schramm et al. | |
| 6,115,406 A | 9/2000 | Mesecher | |
| 6,463,296 B1 | 10/2002 | Esmailzadeh et al. | |
| 6,633,600 B2 * | 10/2003 | Lomp et al. | 375/141 |
| 6,748,024 B2 | 6/2004 | Kuchi et al. | |
| 7,130,663 B2 | 10/2006 | Guo | |
| 7,164,725 B2 | 1/2007 | Frank | |
| 7,218,684 B2 | 5/2007 | Bolourchi et al. | |
| 2001/0038666 A1 * | 11/2001 | Mesecher et al. | 375/148 |
| 2002/0044591 A1 | 4/2002 | Lee et al. | |
| 2002/0155818 A1 | 10/2002 | Boros et al. | |
| 2003/0092456 A1 * | 5/2003 | Dent | 455/503 |

FOREIGN PATENT DOCUMENTS

EP  1 191 706 A2  3/2002

(Continued)

OTHER PUBLICATIONS

Kishiyama et al. "Weight Estimation for Downlink Null Steering in a TDD/SDMA System" 2000 IEEE.

(Continued)

*Primary Examiner* — Khai Tran
(74) *Attorney, Agent, or Firm* — Volpe and Koenig, P.C.

(57) ABSTRACT

The number of users and data capacity of wireless systems are increased by employing apparatus and method for increasing the number of spreading codes available in the system by providing a mechanism to reuse the already allocated spreading code or use the codes that may correlate to those already being used within the same sector/cell. This, in return, provides capacity improvement proportional to the number of added base station (BS) antennas for each cell. An antenna null steering technique for code allocation maintains the cross correlation properties of the codes only for the desired user and to obtain a gain in capacity improvement.

19 Claims, 2 Drawing Sheets

FOREIGN PATENT DOCUMENTS

| | | |
|---|---|---|
| JP | 2001-127699 | 5/2001 |
| JP | 2001-169344 | 6/2001 |
| WO | 01/71928 | 9/2001 |
| WO | 01/76110 | 10/2001 |

OTHER PUBLICATIONS

Jotten et al. "Comparison of Transmit Array Algorithms for Code Division Multiple Access downlinks Operating in the Frequency Division Duplexing Mode" Research Group for RF Communications, University of Kaiserslautern, 2001 IEEE, pp. E-16-E-21.

Nishimura et al. "Downlink Beamforming Performance for an SDMA Terminal with Joint Detection." IEEE VTC, Oct. 11, 2001, vol. 3, pp. 1538-1542.

Nishimura et al. "SDMA Downlink Beamforming for a MIMO Channel." The Institute of Electronics, Information and Communication Engineers, Oct. 2001. (English Abstract Only).

* cited by examiner

METHOD AND SYSTEM FOR CODE REUSE AND CAPACITY ENHANCEMENT USING NULL STEERING

CROSS REFERENCE TO RELATED APPLICATIONS

This application is a continuation of U.S. patent application Ser. No. 11/731,617 filed Mar. 30, 2007, which issues as U.S. Pat. No. 7,469,021 on Dec. 23, 2008, which is a divisional application of U.S. patent application Ser. No. 10/284,741, filed Oct. 31, 2002, which issued as U.S. Pat. No. 7,218,684 on May 15, 2007, which claims the benefit of U.S. Provisional Application Ser. No. 60/335,616, filed Nov. 2, 2001, which are incorporated by reference as if fully set forth.

FIELD OF THE INVENTION

The present invention relates to the field of wireless communication. More specifically, the present invention relates to increasing the number of users and data capacity and data rate of wireless systems. More specifically, in order to increase the capacity, the present invention employs a system which allows the same or correlated signatures to be used for different users simultaneously during the operation of the system.

BACKGROUND OF THE INVENTION

Traditionally, the capacity of Code Division Multiple Access (CDMA) systems, the number of users simultaneously supported in a cell and the data rate allocated to the users, are dependent on availability of the spreading codes functioning as user's signatures, and their cross-correlation properties. If one code is assigned to a user, it cannot be used for the other uses at the same time. This rule is adopted even for the systems with multiple transmission antennas which generate beam steering (beam forming) as a means of interference reduction. Although the current beam steering technology can achieve certain capacity enhancement, the result (of capacity enhancement) is quite limited since the interference cannot be completely removed to a specific location in the field. In addition, from an implementation point of view, such a multiple antenna system is quite complex.

SUMMARY OF THE INVENTION

This invention provides a mechanism to allow reusing the already allocated spreading code or using the codes that may correlate to those already being used within the same sector and/or cell. This in return provides capacity improvement proportional to the number of added Base Station antennas for each cell. The present invention employs an antenna null steering technique for code allocation to maintain the cross correlation properties of the codes only for the desired user and to gain capacity improvement.

BRIEF DESCRIPTION OF THE INVENTION

The present invention will be understood when reading the accompanying description and drawings, wherein like elements are designated by like numerals, and wherein.

DETAILED DESCRIPTION OF THE INVENTION AND THE PREFERRED EMBODIMENTS THEREOF

The present invention uses a simple antenna null steering technique for suppressing the power of the undesired interference signals, which may use the same or correlated spreading codes, at a desired receiver. Since the spreading codes can be reused simultaneously, the capacity of the whole system can be increased. The simplicity and ease of implementation is one advantage of the null steering method. However, due to the ease of implementation, the null steering technique can be used as a complementary method along with beam steering to provide further improvement of system capacity.

The concept may use different spreading codes, users and antennas. However, the present invention is described using the same or correlated spreading code for N users simultaneously, utilizing N+1 antennas. Channel information such as the spatial information is used by N+1 antennas of a Base Station BS to create a null at all user locations with the identical or correlated spreading code but the desired one. The concept is illustrated below for the case where N=2, where N= the number of users.

Figure 1:
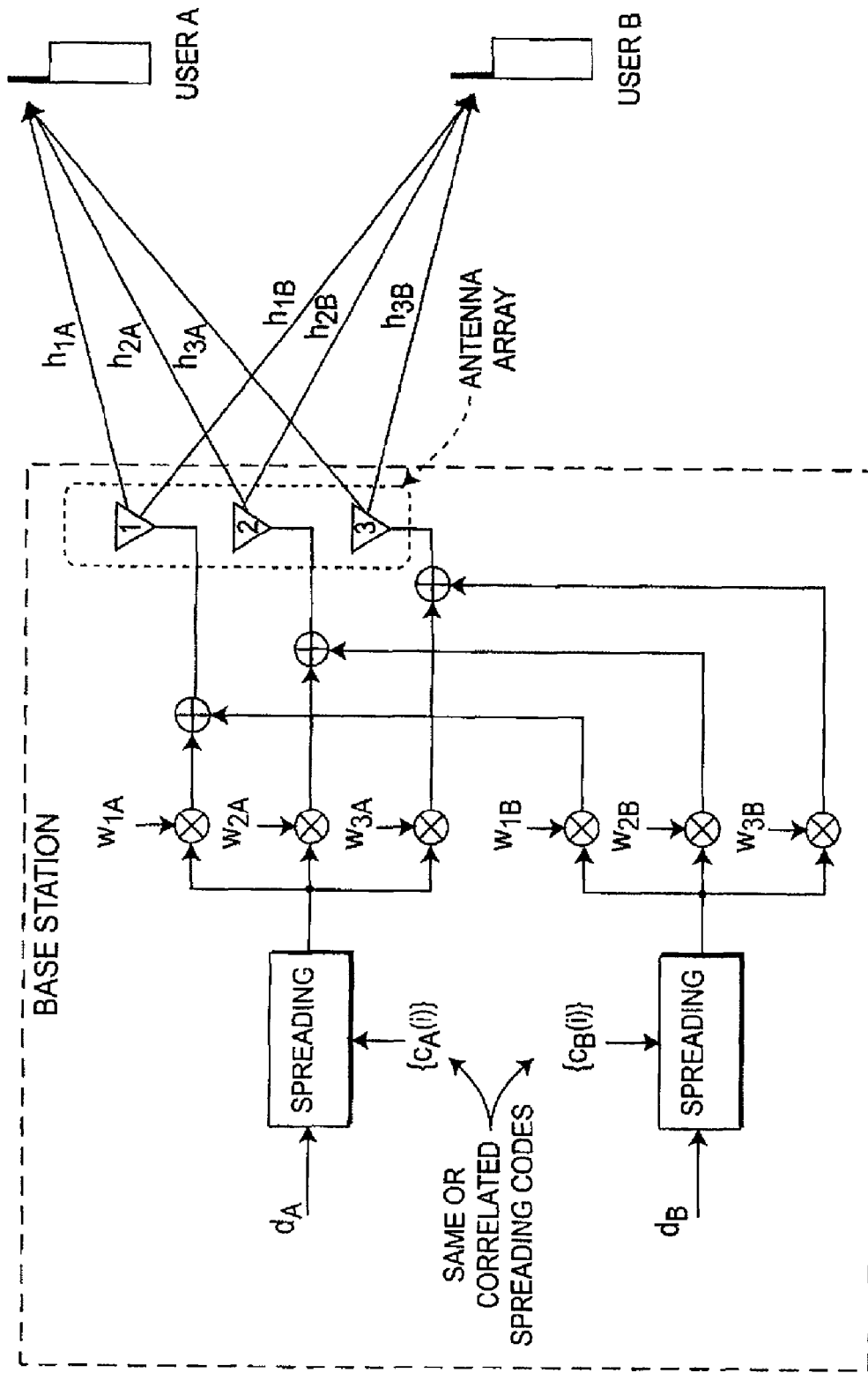
FIG. 1 is a schematic diagram of a processing unit embodying the principles of the present invention.

Considering a two-user case. The system is depicted in FIG. 1, where, for i=1, 2, 3, $h_{iA}$ and $h_{iB}$ represent the channel impulse responses from antenna i to user A and user B, respectively. $d_A$ and $d_B$ indicate the data transmitted to the user A and B, respectively. Note that data $d_A$ and $d_B$ are spread by the same or correlated codes $\{c_A(k), k=1, 2, \ldots\}$ and $\{c_B(k), k=1, 2, \ldots\}$ before data transmission at the base station. Our objective is to transmit information for user A without creating any interference to user B and, at the same time, transmit information for user B without creating any interference to user A. This objective is achieved by creating a null at the location of user B by altering the composite channel impulse response from BS to user A and creating a null at the location of user A by altering the composite channel impulse response from BS to user B. Here the composite channel impulse response is defined as a transfer function from spreader output at the BS to the antenna user's receiver unit.

To create a null at user B, we will select the complex weights, $W_{1A}$, $W_{2A}$ and $W_{3A}$ so that the gain of the composite channel from the base station to user A is maximized and the composite channel gain from the base station to user B is 0. Mathematically, it is a constraint optimization problem, which can be expressed as follows:

$$\max_{w_{1A}, w_{2A}, w_{3A}} \left( \sum_{i=1}^{3} w_{iA} h_{iA} \right) * \left( \sum_{i=1}^{3} w_{iA} h_{iA} \right) \qquad \text{Equation 1}$$

$$\text{subject to } \sum_{i=1}^{3} w_{iA} h_{iB} = 0$$

Similarly, to create a null at user A, we will select the complex weights, $w_{1B}$, $w_{2B}$ and $w_{3B}$ so that the gain of the composite channel from the base station to user B is maximized and the composite channel gain from the base station to user A is 0. Mathematically, it is likewise a constraint optimization problem, which can be expressed as follows:

$$\max_{w_{1B},w_{2B},w_{3B}} \left(\sum_{i=1}^{3} w_{iB}h_{iB}\right) * \left(\sum_{i=1}^{3} w_{iB}h_{iB}\right) \quad \text{Equation 2}$$

$$\text{subject to } \sum_{i=1}^{3} w_{iB}h_{iA} = 0$$

The optimization problem described above can be easily solved. Next, as an example, we show how to determine $w_{1A}$, $w_{2A}$ and $w_{3A}$ from Equation 1. First from the constraint in Equation 1, we choose $w_{3A}$ as follows:

$$w_{3A} = -\frac{w_{1A}h_{1B} + w_{2A}h_{2B}}{h_{3B}} \quad \text{Equation 3}$$

Applying $w_{3A}$, the composite channel impulse response at user A becomes:

$$w_{1A}g_1 + w_{2A}g_2; \quad \text{Equation 4}$$

where, $$g_i = h_{iA} - \frac{h_{3A}}{h_{3B}}h_{iB} \text{ for } i = 1, 2 \quad \text{Equation 5}$$

In general, $g_i$ is a complex number. Define $g_i = a_i e^{j\phi_i}$ for $i=1, 2$; where $a_i > 0$ for $i=1, 2$. Also, define $$w_{iA} = e^{j\theta_i} \text{ for } i=1, 2.$$

It can be shown that the channel gain of the composite channel impulse response from the base station to user A is $$\left(\sum_{i=1}^{3} w_{iA}h_{iA}\right) * \left(\sum_{i=1}^{3} w_{iA}h_{iA}\right) = \quad \text{Equation 6}$$

$$a_1^2 + a_2^2 + 2a_1 a_2 \cos(\theta_2 - \theta_1 + \phi_2 - \phi_1)$$

It is clear that, to reach the maximum possible gain, we should have:

$$\theta_2 - \theta_1 + \phi_2 - \phi_1 = 0 \quad \text{Equation 7}$$

One approach to satisfy the above equation is to choose:

$$w_{iA} = \frac{1}{a_i}g_i^* \text{ for } i=1, 2 \quad \text{Equation 8}$$

Figure 2:
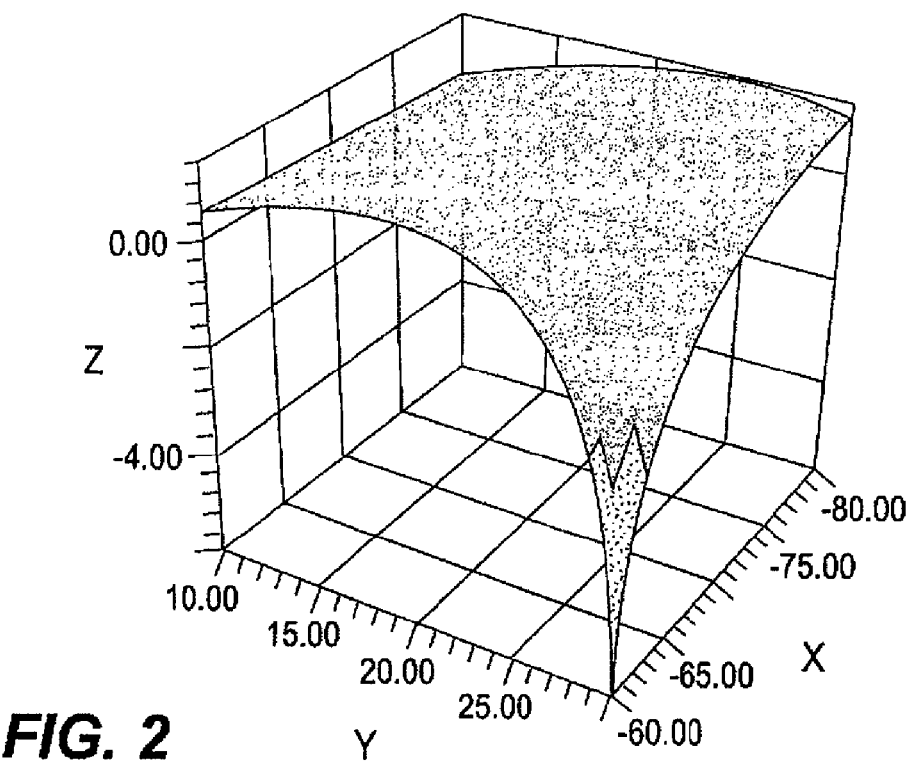
FIG. 2 is a three-dimensional diagram of the combined channel power profiles as calculated in accordance with a mathematical example of the present invention.
Figure 3:
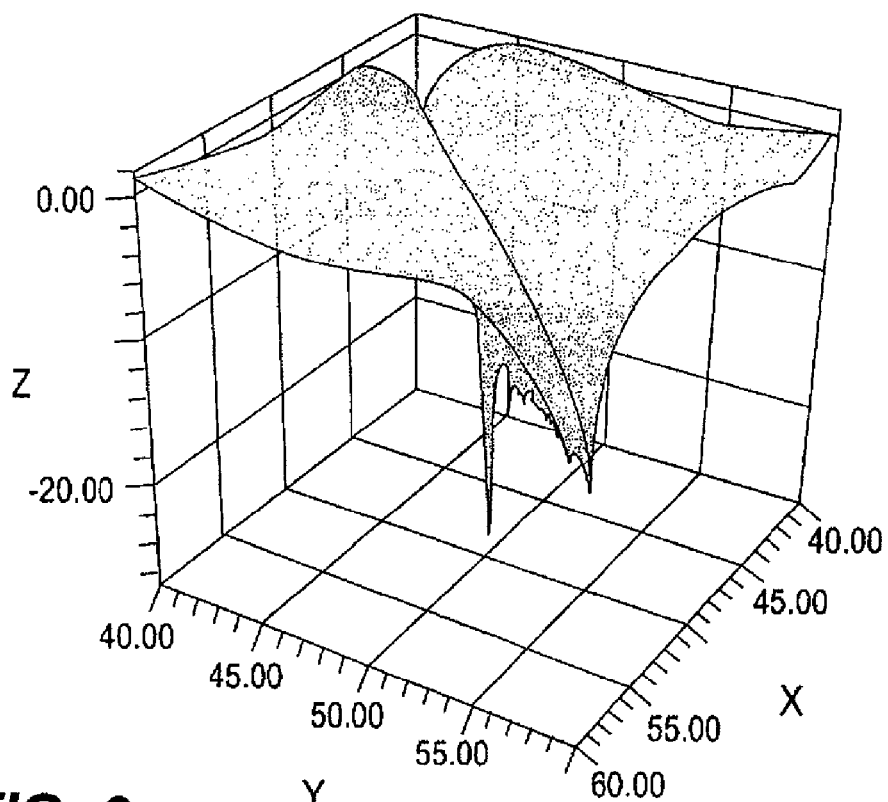
FIG. 3 is a three-dimensional diagram of the combined channel power profiles as calculated in accordance with a mathematical example of the present invention.

For example, define a simplified channel model as $$h_{ip} = \exp\left(j2\pi\frac{D_{ip}}{\lambda}\right); \quad \text{Equation 9}$$

for $i=1, 2, 3$, and $p=A, B$, where $D_{ip}$ is the distance from user p to antenna i, and $\lambda$ is the wavelength, which is 0.15 m in this example. In addition, we assume that the three (3) antennas are distributed along the X axis in a OXY plane with space between two adjacent antennas being 0.75 m and antenna 2 being placed at the origin (O) of the OXY plane. We choose the location for user A being $(x_A, y_A)=(-70,20)$ and user B being $(x_B, y_B)=(50, 50)$. The composite channel power profiles (in dB) near these two points are shown in FIG. 2 and FIG. 3, respectively. Thus, by generating the complex values $w_{1A}$, $w_{2A}$ and $w_{3A}$, the desired user A, in the example of FIG. 1, will receive the communication with maximum power (FIG. 2) whereas the power at the other user will be nulled (FIG. 3).

What is claimed is:

1. Apparatus for wireless communication with at least two mobile units using a null beam steering technique, comprising:
   first and second data sources each having data intended for a different one of said mobile units;
   first and second units for respectively spreading input data from said first and second data sources, each employing a spreading code for spreading their associated input data, said spreading code being one of a same spreading code or a correlated spreading code;
   first and second groups of complex weighting values respectively associated with said first and second data sources, each group of complex weighting values being respectively supplied to inputs of first and second groups of circuits, each of said first and second groups of circuits respectively receiving an output of said first and second units, for multiplying each received output responsive to an associated complex weighting value input;
   an antenna array comprising a given number of antennas which is greater than a number of data sources; and
   a third group of circuits each combining an output of one of said circuits in said first group with an associated one of said circuits of said second group and delivering an output of each circuit of said third group to an associated one of said antennas in said array, said antennas being arranged to limit the mobile units to receipt of data from only one of said data sources.

2. The apparatus as claimed in claim 1, wherein N remote users are configured to receive data, and the number of antennas in the antenna array is N+1.

3. The apparatus of claim 2, wherein the number of complex weighting value inputs in each group is N+1.

4. The apparatus of claim 2, wherein the number of combining circuits is N+1.

5. The apparatus of claim 1, wherein said first and second spreading units both employ a given spreading code.

6. The apparatus of claim 1, wherein said first and second spreading units employ correlated spreading codes.

7. The apparatus of claim 1, wherein said circuits of said third group are summing circuits.

8. The apparatus of claim 1, wherein the antennas are spaced apart in a given manner.

9. The apparatus of claim 1, wherein the antennas are arranged in a linear manner.

10. The apparatus of claim 1, wherein the antennas are arranged in a linear manner and spaced at predetermined intervals.

11. The apparatus of claim 1, wherein the complex weighting inputs are a function of the number of antennas in the array.

12. The apparatus of claim 11, wherein on a condition that data is sent to two remote units, complex weighting values of the one group of complex weighting inputs are selected to provide a power of a communication received by a first one of the remote users which is maximized.

13. The apparatus of claim 12, wherein said one group of complex weighting values are selected so that a power of a communication received by a second one of the remote users is minimized.

14. The apparatus of claim 13, wherein complex weighting values of a remaining one of said groups of complex weighting inputs are selected so that a power of a communication received by a second one of the remote users is maximized.

15. The apparatus of claim 14, wherein complex weighting values of said remaining one of said groups of complex weighting inputs are selected so that a power of a communication received by a the first one of the remote users is maximized.

16. The apparatus of claim 1, wherein said first and second groups of circuits are modulators.

17. The apparatus of claim 1, wherein said apparatus is employed by a base station.

18. The apparatus of claim 1, wherein the antennas are arranged to provide beam steering.

19. The apparatus of claim 1, wherein said first and second groups of circuits are amplifiers each having a gain adjustable responsive to a complex weighting input applied thereto.

* * * * *

UNITED STATES PATENT AND TRADEMARK OFFICE
CERTIFICATE OF CORRECTION

| | | |
|---|---|---|
| PATENT NO. | : 8,149,895 B2 | Page 1 of 1 |
| APPLICATION NO. | : 12/329516 | |
| DATED | : April 3, 2012 | |
| INVENTOR(S) | : Bolourchi et al. | |

It is certified that error appears in the above-identified patent and that said Letters Patent is hereby corrected as shown below:

ON THE TITLE PAGE

Item (75), Inventors, page 1, left column, before "Bolourchi", delete "Nadar" and insert --Nader--.

IN THE CLAIMS

At Claim 15, column 5, line 8, after "received by a", delete "the".

Signed and Sealed this
Thirtieth Day of April, 2013

Teresa Stanek Rea
*Acting Director of the United States Patent and Trademark Office*